United States Patent
Tanaka et al.

(10) Patent No.: US 12,214,458 B2
(45) Date of Patent: Feb. 4, 2025

(54) PISTON RING INSTALLATION JIG AND PISTON RING INSTALLATION METHOD USING THE JIG

(71) Applicant: SUBARU CORPORATION, Tokyo (JP)

(72) Inventors: Atsushi Tanaka, Tokyo (JP); Manabu Sato, Tokyo (JP); Toshihiko Furukawa, Tokyo (JP); Nanaka Hosoda, Tokyo (JP); Ryuta Shinohara, Tokyo (JP); Tomoki Kajikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/454,295

(22) Filed: Aug. 23, 2023

(65) Prior Publication Data
US 2024/0082965 A1    Mar. 14, 2024

(30) Foreign Application Priority Data
Sep. 12, 2022   (JP) .................... 2022-144900

(51) Int. Cl.
*B23P 19/08*    (2006.01)
*B25B 27/12*    (2006.01)

(52) U.S. Cl.
CPC ............ *B23P 19/088* (2013.01); *B25B 27/12* (2013.01)

(58) Field of Classification Search
CPC .......... B23P 19/088; B23P 19/10; B25B 5/04; B25B 11/02; B25B 27/12;
(Continued)

(56) References Cited

U.S. PATENT DOCUMENTS

| 1,013,349 A | * | 1/1912 | Whitty | B25B 27/12 |
| | | | | 29/222 |
| 1,454,349 A | * | 5/1923 | Teetor | B23Q 3/061 |
| | | | | 29/888.07 |

(Continued)

FOREIGN PATENT DOCUMENTS

CN    215436007 U  *  1/2022
JP     4167208 B2    10/2008

OTHER PUBLICATIONS

Translation of CN215436007 (Year: 2022).*

*Primary Examiner* — Matthew P Travers
(74) *Attorney, Agent, or Firm* — Smith, Gambrell & Russell, LLP

(57) ABSTRACT

A piston ring installation jig is to be used when installing a piston ring having a ring gap in a ring groove formed in an outer peripheral surface of a piston. The piston ring installation jig includes a main body including a groove. The main body has in a semi-cylindrical shape surrounding the outer peripheral surface of the piston. The groove has a substantially semicircular arc shape, and is formed in an inner peripheral surface of the main body in a region corresponding to the ring groove of the piston. A portion of the piston ring in a circumferential direction is inserted into the groove. The groove has a shape of an arc of a circle which has a circle center biased more to an outer peripheral side of the main body than a circle center of an inner peripheral surface of the main body.

5 Claims, 11 Drawing Sheets

(58) Field of Classification Search
CPC . Y10T 29/536–53609; Y10T 29/53904; Y10T 29/53978
See application file for complete search history.

(56) References Cited

U.S. PATENT DOCUMENTS

| | | | | | |
|---|---|---|---|---|---|
| 1,675,603 | A | * | 7/1928 | Graves | B25B 27/12 279/151 |
| 1,758,719 | A | * | 5/1930 | Smith | B22D 15/02 29/888.072 |
| 1,764,146 | A | * | 6/1930 | Bramberry | B25B 27/12 29/224 |
| 2,183,358 | A | * | 12/1939 | Six | C21D 9/40 29/888.07 |
| 5,404,629 | A | * | 4/1995 | Liechty | B25B 27/12 29/888.044 |

* cited by examiner

PISTON RING INSTALLATION JIG AND PISTON RING INSTALLATION METHOD USING THE JIG

CROSS-REFERENCE TO RELATED APPLICATIONS

The present application claims priority from Japanese Patent Application No. 2022-144900 filed on Sep. 12, 2022, the entire contents of which are hereby incorporated by reference.

BACKGROUND

The disclosure relates to a piston ring installation jig used when installing a piston ring to a piston, and a piston ring installation method using the jig.

In an operation of installing an internal combustion engine of a vehicle such as an automobile, a piston that constitutes the internal combustion engine is mounted to a cylinder block while a piston ring is installed in a ring groove formed in an outer peripheral surface of the piston.

An installation jig is used when installing the piston ring in the ring groove of the piston. An example of such an installation jig is a jig that expands the diameter of the piston ring, for example, as disclosed in JP 4167208 B. The piston ring has a ring gap that is formed by cutting out a portion of the piston ring. This ring gap allows the diameter of the piston ring to be expanded or reduced. In the jig disclosed in JP 4167208 B, forming an escape groove, into which both ends of the cut piston ring are inserted, in a cylindrical body for expanding the diameter of the piston ring prevents or inhibits distortion of the piston ring when expanding the diameter of the piston ring.

The outer diameter of the piston ring is set larger than the outer diameter of the piston. When inserting the piston installed with the piston ring into a cylinder, an installer is used to make the diameter of the piston ring smaller than the bore diameter of the cylinder. As illustrated in FIG. 7, an installer 90 is formed in a cylindrical shape. The installer 90 has an inner peripheral surface 92 formed in a tapered shape having an inner diameter that becomes smaller toward one end portion. FIG. 7 illustrates a state in which a piston 50 installed with piston rings 60, 70 is inserted into the installer 90.

SUMMARY

An aspect of the disclosure provides a piston ring installation jig to be used when installing a piston ring having a ring gap in a ring groove formed in an outer peripheral surface of a piston. The piston ring installation jig includes a main body having in a semi-cylindrical shape surrounding the outer peripheral surface of the piston. The main body includes a groove. The groove has a substantially semicircular arc shape and is formed at an inner peripheral surface of the main body in a region corresponding to the ring groove of the piston. A portion of the piston ring in a circumferential direction is inserted into the groove. The groove has a shape of an arc of a circle which has a circle center biased more to an outer peripheral side of the main body than a circle center of an inner peripheral surface of the main body.

A piston ring installation method according to an embodiment of the disclosure is a piston ring installation method using the piston ring installation jig. The piston ring installation method includes inserting a portion of the piston ring other than the ring gap into the groove of the main body, and installing the piston ring to the piston to position the ring gap in the ring groove of the piston.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

When an installer is used while a ring gap of a piston ring protrudes radially outward from the piston ring groove, the ends of the ring at the ring gap protruding from the ring groove are caught between an outer peripheral surface of the piston and an inner peripheral surface of the installer. If an attempt is made to further push the piston into the installer in this state, a problem arises in that the piston and the piston ring become damaged.

In light of the problem described above, it is desirable to provide a piston ring installation jig, and a piston ring installation method using the jig, that can cause a ring gap in a piston ring to be accommodated in a ring groove of a piston when installing the piston ring in the ring groove of the piston.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
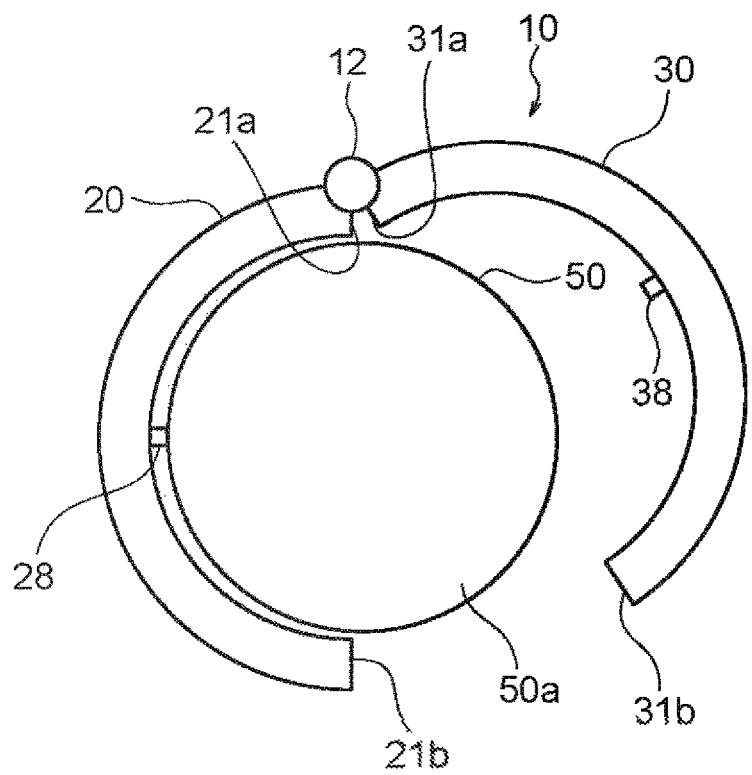
FIG. 1 is a plan view schematically illustrating a piston ring installation jig according to an embodiment of the disclosure, and a piston.
Figure 2:
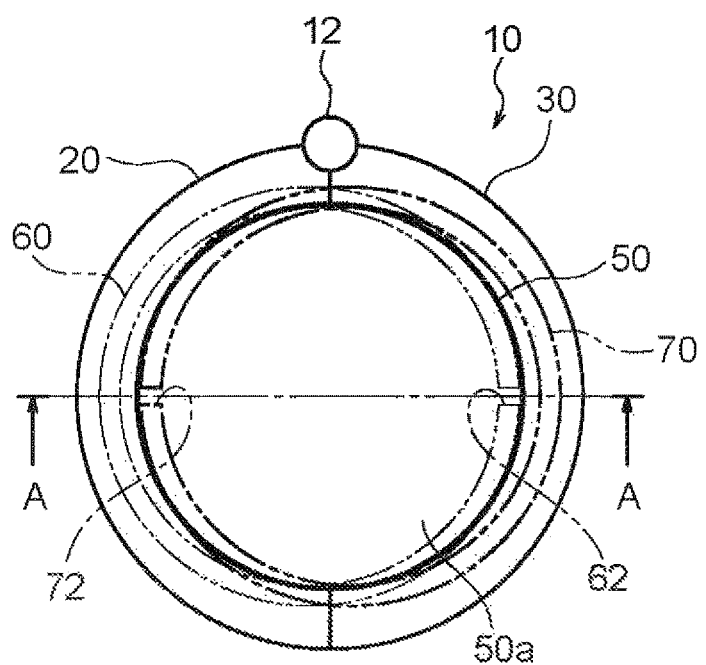
FIG. 2 is a plan view illustrating a state in which piston rings have been installed on the piston using the piston ring installation jig.
Figure 3:
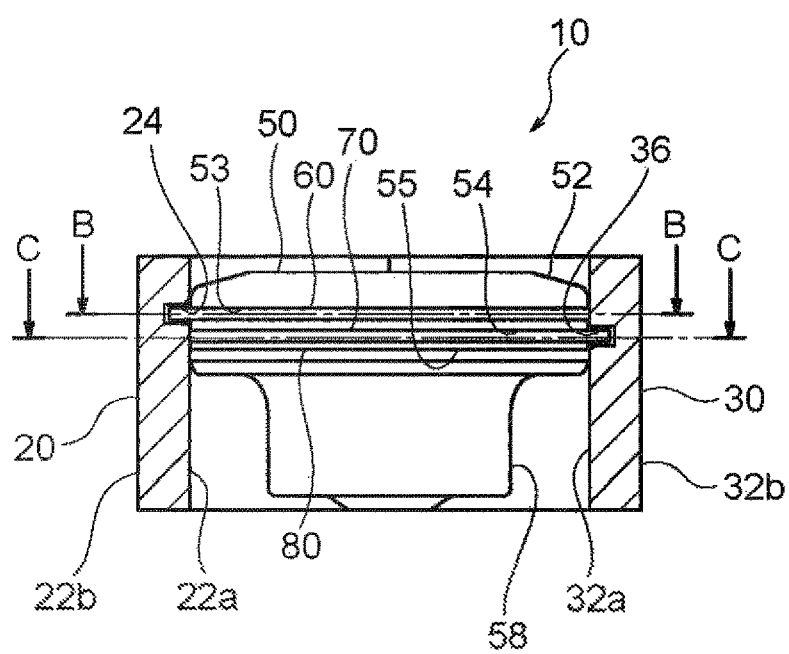
FIG. 3 is a cross-sectional view of the piston ring installation jig taken along line A-A in FIG. 2.

FIG. 1 is a plan view schematically illustrating a piston ring installation jig 10 according to a first embodiment of the disclosure, and a piston 50. FIG. 2 is a plan view illustrating a state in which a top ring 60 and a second ring 70, serving as piston rings, have been installed on the piston 50 using the piston ring installation jig 10. FIG. 3 is a cross-sectional view of the piston ring installation jig 10 taken along line A-A in FIG. 2. In FIG. 3, the piston 50, the top ring 60, the second ring 70, and an oil ring 80 described later, all of which are accommodated in the piston ring installation jig 10, are illustrated in a non-cross-sectional state, and a first protrusion 28 and a second protrusion 38, which will be described later, are not illustrated.

The piston ring installation jig 10 (hereinafter also simply referred to as the "jig 10") is used to install the piston rings, in particular, the top ring 60 and the second ring 70 that are compression rings, into ring grooves 53, 54 formed in an outer peripheral surface of the piston 50, respectively. As illustrated in FIGS. 1 and 2, the jig 10 includes a first main body 20 and a second main body 30, each of which is formed in a semi-cylindrical shape so as to surround the outer peripheral surface of the piston 50, and a hinge 12 that couples the first main body 20 and the second main body 30. Hereinafter, the piston 50, the top ring 60, the second ring 70, and the jig 10 will be described in detail.

As illustrated in FIG. 3, the piston 50 includes a substantially cylindrical head 52 forming an upper surface 50a and including multiple ring grooves 53, 54, 55 formed in an outer peripheral surface of the head 52, and a skirt 58 formed continuously with the head 52. In the piston 50 illustrated in FIG. 3, the diameter of the head 52 is larger than the diameter of the skirt 58. The multiple ring grooves 53, 54, 55 are formed in the outer peripheral surface of the head 52 at predetermined intervals in an axial direction. In the following description, for convenience, the ring groove 53 formed at an upper stage of the head 52 will be referred to as a first ring groove 53, the ring groove 54 formed at a middle stage of the head 52 will be referred to as a second ring groove 54, and the ring groove 55 formed at a lower stage of the head 52 will be referred to as a third ring groove 55. In the present embodiment, each of the ring grooves 53, 54, 55 is formed to have substantially the same depth.

The top ring 60 (first piston ring) and the second ring 70 (second piston ring) are respectively installed in the first ring groove 53 and the second ring groove 54 of the piston 50. In the following description, the top ring 60 and the second ring 70 are also collectively referred to as compression rings 60, 70. The oil ring 80 is installed in the third ring groove 55 of the piston 50. Each of the compression rings 60, 70 has a gas sealing function of suppressing the outflow of combustion gas from a combustion chamber side to a crank chamber side by maintaining airtightness between the piston 50 and a cylinder in an internal combustion engine, and also has an oil sealing function of suppressing oil loss via the piston ring, by scraping off excess oil adhering to an inner wall of the cylinder that has not been completely scraped off by the oil ring 80. Each of the rings 60, 70, 80 is formed of an elastic material so that the diameter thereof can be expanded or reduced.

The outer diameters of the compression rings 60, 70 are formed to be larger than the outer diameter of the head 52 of the piston 50 and the outer diameter of the oil ring 80. The outer diameter of the oil ring 80 is formed to be slightly larger than the outer diameter of the head 52 of the piston 50. As illustrated in FIG. 3, in a state in which the oil ring 80 is installed on the piston 50, the entire periphery of the oil ring 80 is almost completely accommodated in the third ring groove 55.

Figure 4:
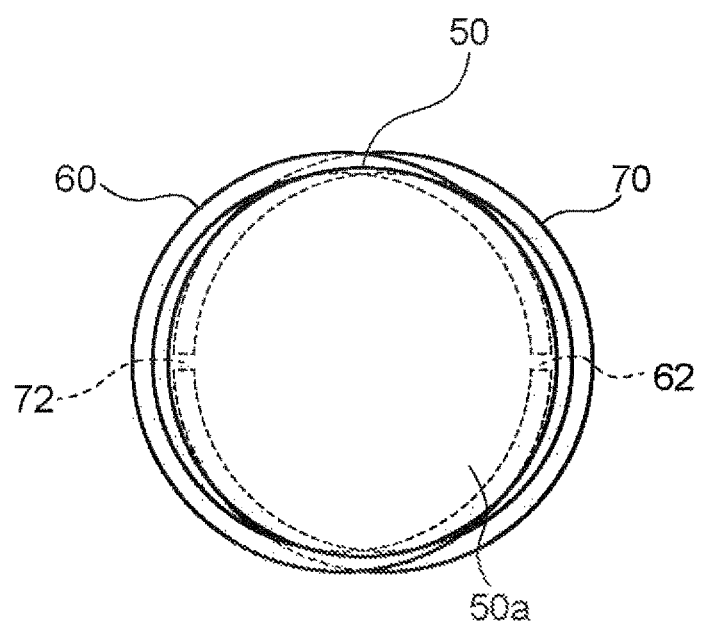
FIG. 4 is a plan view illustrating a state in which the piston rings are installed on the piston.

As illustrated in FIG. 4, when the compression rings 60, 70 are assembled to the piston 50, portions of the compression rings 60, 70 in the circumferential direction protrude radially outward from the ring grooves 53, 54, respectively. In FIG. 4, portions of the top ring 60 and the second ring 70, which are accommodated in the ring grooves 53, 54 of the piston 50, respectively, are indicated by broken lines. As illustrated in FIG. 2, the top ring 60 and the second ring 70 are each formed in an annular shape, and include ring gaps 62, 72, respectively, that are formed by portions of the top ring 60 and the second ring 70 being cut out, so that the top ring 60 and the second ring 70 can be expanded or contracted. In the present embodiment, the top ring 60 and the second ring 70 have substantially the same outer diameter, inner diameter, and thickness.

As described above, the jig 10 includes the first main body 20, the second main body 30, and the hinge 12 that couples the first main body 20 and the second main body 30.

As illustrated in FIGS. 2 and 3, the first and second main bodies 20, 30 are each formed in a semi-cylindrical shape, and are disposed opposing each other so as to form a cylindrical shape surrounding the outer peripheral surface of the piston 50 in a set state. In the present embodiment, as illustrated in FIG. 1, first end portions 21a, 31a, which are one end portions, in the circumferential direction, of the main bodies 20, 30 are coupled to each other via the hinge 12, and second end portions 21b, 31b, which are the other end portions thereof, are configured to open and close. In the present embodiment, the height (length in the axial direction) of each of the main bodies 20, 30 is set to be slightly higher than the height of the piston 50.

Figure 5:
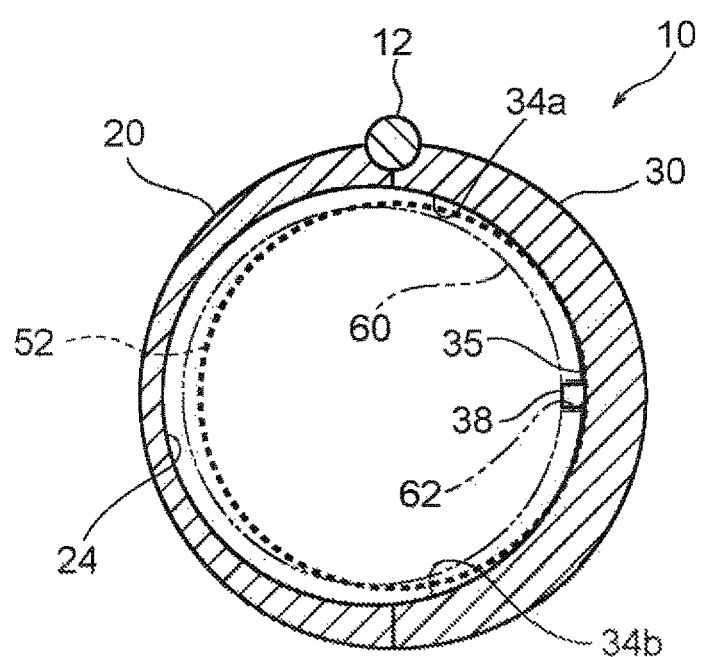
FIG. 5 is a cross-sectional view of the piston ring installation jig taken along line B-B in FIG. 3.
Figure 6:
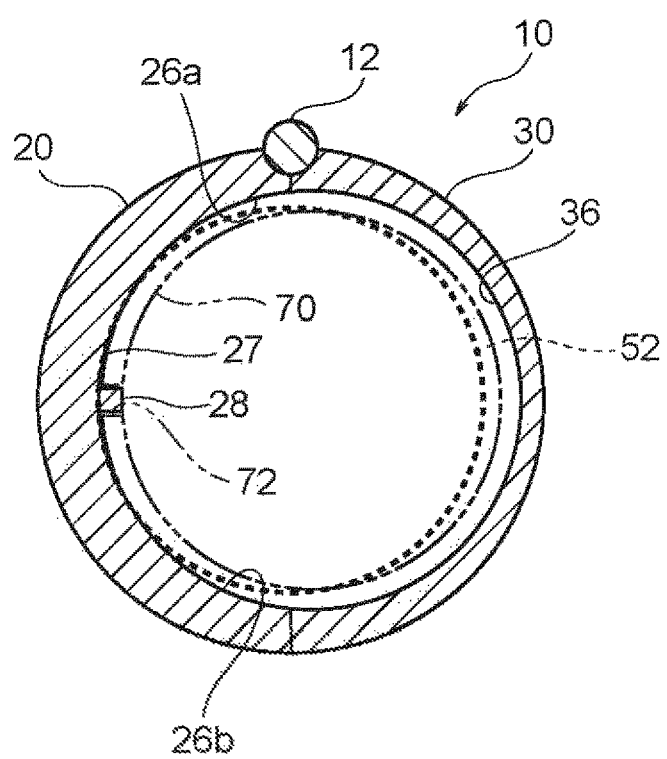
FIG. 6 is a cross-sectional view of the piston ring installation jig taken along line C-C in FIG. 3.

FIG. 5 is a cross-sectional view of the piston ring installation jig 10 taken along line B-B in FIG. 3, and FIG. 6 is a cross-sectional view of the piston ring installation jig 10 taken along line C-C in FIG. 3. In FIGS. 5 and 6, the outer circumference of the head 52 of the piston 50 is indicated by a thick broken line, the top ring 60 is indicated by an imaginary line in FIG. 5, and the second ring 70 is indicated by an imaginary line in FIG. 6.

The first and second main bodies 20, 30 include substantially semicircular arc-shaped grooves 24, 36 formed in inner peripheral surfaces 22a, 32a thereof, respectively. Portions of the top ring 60 and the second ring 70 in the circumferential direction are fitted into the grooves 24, 36, respectively. Outer peripheral surfaces 22b, 32b of the main bodies 20, 30 are each formed in a curved surface shape having no unevenness. As illustrated in FIGS. 3 and 5, the first main body 20 includes the first groove 24 in a region corresponding to the first ring groove 53 of the piston 50. Further, as illustrated in FIGS. 3 and 6, the second main body 30 includes the second groove 36 in a region corresponding to the second ring groove 54 of the piston 50. Here, the region corresponding to the first ring groove 53 and the region corresponding to the second ring groove 54 refer to regions in which the inner peripheral surfaces 22a, 32a of the main bodies 20, 30 oppose the first ring groove 53 and the second ring groove 54 of the piston 50, respectively, in the set state in which the piston 50 is accommodated in the jig 10.

In the present embodiment, as illustrated in FIG. 2, in a state in which a bottom surface of the jig 10 and a bottom surface of the piston 50 coincide in the axial direction, the first groove 24 and the second groove 36 are formed in the inner peripheral surfaces 22a and 32a of the main bodies 20, 30, opposing the first ring groove 53 and the second ring groove 54 of the piston 50, respectively. The first groove 24 has a circular arc shape whose circle center is biased more to the outer peripheral side of the first main body 20 than the circle center of the inner peripheral surface 22a of the first main body 20. The second groove 36 has a circular arc shape whose circle center is biased more to the outer peripheral side of the second main body 30 than the circle center of the inner peripheral surface 32a of the second main body 30.

As illustrated in FIGS. 3 and 6, the first main body 20 includes a first non-groove-formed portion 27 that is flush with the inner peripheral surface 22a of the first main body 20, in the region corresponding to the second ring groove 54 of the piston 50. As illustrated in FIG. 6, the first protrusion 28 protruding radially inward is formed at the first non-groove-formed portion 27. Further, as illustrated in FIGS. 3 and 5, the second main body 30 includes a second non-groove-formed portion 35 that is flush with the inner peripheral surface 32a of the second main body 30, in the region corresponding to the first ring groove 53 of the piston 50. As illustrated in FIG. 5, the second protrusion 38 protruding radially inward is formed at the second non-groove-formed portion 35.

The widths of the protrusions 28, 38 are set to be smaller than the widths of the ring gaps 62, 72 of the compression rings 60, 70, respectively. Further, the protruding lengths of the protrusions 28, 38 are set to be equal to or less than the depths of the ring grooves 53, 54, respectively.

In the present embodiment, as illustrated in FIGS. 5 and 6, the grooves are formed so that the top ring 60 and the second ring 70 are accommodated in the grooves formed in the inner peripheral surface of the cylindrical jig 10, over a range of a length that is approximately two thirds of the entire circumference of each of the top ring 60 and the second ring 70, in a state in which the second end portions 21b, 31b of the main bodies 20, 30 are closed.

For example, as illustrated in FIG. 5, continuous grooves 34a, 34b are formed at both end portions of the second main body 30 in the circumferential direction, continuous with the first groove 24 of the first main body 20. The second non-groove-formed portion 35 is provided between these continuous grooves 34a, 34b. Further, as illustrated in FIG. 6, continuous grooves 26a and 26b are formed at either end portion, in the circumferential direction, of the first main body 20, continuous with the second groove 36 of the second main body 30. The first non-groove-formed portion 27 is provided between these continuous grooves 26a, 26b. The first and second grooves 24, 36 are formed so as to have the largest groove depth at center portions of the main bodies 20, 30 in the circumferential direction, respectively. The groove depths of the first and second grooves 24, 36 gradually decrease from the center portions toward the continuous grooves 26a, 26b, 34a, 34b, respectively. Further, in the present embodiment, the first and second protrusions 28, 38 are provided so as to be positioned at the center portions of the first and second main bodies 20, 30 in the circumferential direction, respectively.

Next, a piston ring installation method using the jig 10 described above will be described. In the installation method using the jig 10, the compression rings 60, 70 are assembled to the piston 50 so that portions of the compression rings 60, 70 excluding the ring gaps 62, 72 are inserted into the grooves 24, 36 of the main bodies 20, 30, respectively, and the ring gaps 62, 72 are positioned in the ring grooves 53, 54 of the piston 50, respectively. Hereinafter, installation steps will be described in detail.

First, the top ring 60, the second ring 70, and the oil ring 80 are fitted into the first ring groove 53, the second ring groove 54, and the third ring groove 55 of the piston 50, respectively (step of fitting piston rings).

Thereafter, the rings 60, 70 are rotated so that the ring gap 62 of the top ring 60 is positioned in the first ring groove 53, the ring gap 72 of the second ring 70 is positioned in the second ring groove 54, and the ring gaps 62, 72 are positioned at positions shifted by 180 degrees from each other in the circumferential direction (step of rotating piston rings). In the present embodiment, the ring gaps 62, 72 are positioned at portions of the ring grooves 53, 54 at which the groove depths are the largest.

In this state, as illustrated in FIG. 2, the second end portions 21b, 31b (see FIG. 1) of the first and second main bodies 20, 30 are closed, and the piston 50 installed with the piston rings is accommodated in the jig 10. At this time, as illustrated in FIG. 5, the second protrusion 38 of the second main body 30 is inserted into the ring gap 62 of the top ring 60 (see FIG. 5), and the first protrusion 28 of the first main body 20 is inserted into the ring gap 72 of the second ring 70 (see FIG. 6). As a result, the ring gaps 62, 72 of the rings 60, 70 are positioned with respect to the ring grooves 53, 54 of the piston 50 (step of positioning using the jig 10). In a case where the protrusions 38, 28 are not appropriately positioned with respect to the ring gaps 62, 72, the second end portions 21b, 31b of the first and second main bodies 20, 30 cannot be made to abut against each other and close. In such a case, the top ring 60 and/or the second ring 70 are rotated so that the positioning is appropriate.

Figure 7:
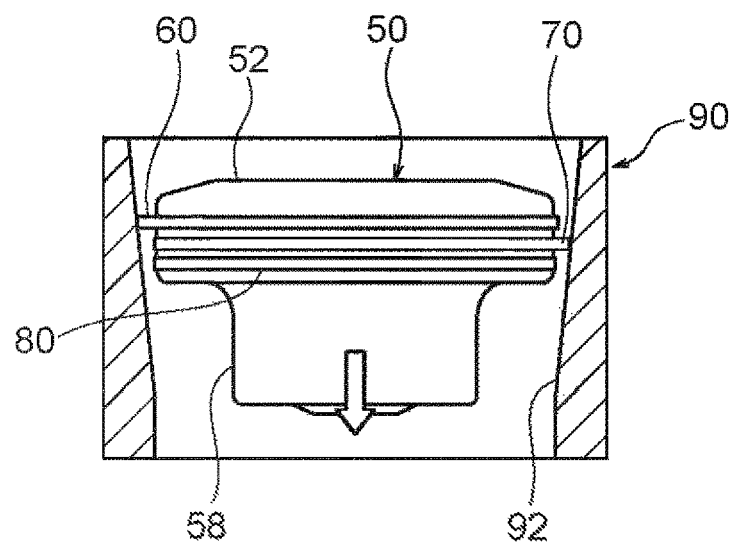
FIG. 7 is a partial cross-sectional view illustrating a state in which the piston installed with the piston rings is inserted into an installer.

The rings 60, 70, 80 installed on the piston 50 in this manner are brought into a state in which the ring gap 62 of the top ring 60 is accommodated in the first ring groove 53 of the piston 50, and the ring gap 72 of the second ring 70 is accommodated in the second ring groove 54 of the piston 50, as illustrated in FIG. 4. In this state, the jig 10 is removed, and the piston 50 is inserted into the cylinder by using an installer 90, as illustrated in FIG. 7.

The installer 90 is formed in a cylindrical shape. An inner peripheral surface 92 of the installer 90 is formed in a tapered shape having an inner diameter that becomes smaller toward one end portion. Pushing the piston 50 downward in FIG. 7 along the tapered surface causes the diameters of the top ring 60 and the second ring 70, both of which partially protrude from the piston 50, to reduce. At this time, since the ring gaps 62, 72 of the rings 60, 70 are accommodated in the ring grooves 53, 54 of the piston 50, respectively, both end portions of the rings 60, 70 do not become sandwiched between the outer peripheral surface of the piston 50 and the inner peripheral surface 92 of the installer 90, and be caused to curl up. Thus, the separation distance of each of the ring gaps 62, 72 of the rings 60, 70 inside the installer 90 can be appropriately reduced, and thus the piston 50 and the rings 60, 70 can be prevented or inhibited from being damaged at the time of installation.

Note that, in the embodiment described above, descriptions of "first", "second", and "third" are merely used for convenience to distinguish the multiple main bodies, multiple ring grooves, and multiple piston rings.

Second Embodiment

Figure 8:
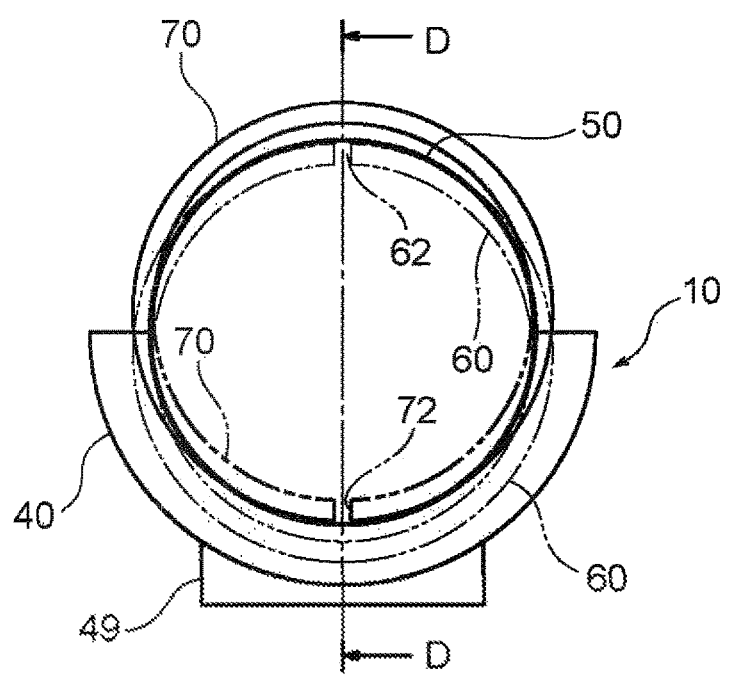
FIG. 8 is a side view illustrating a state in which the piston rings are installed on the piston using a piston ring installation jig according to an embodiment of the disclosure.
Figure 9:
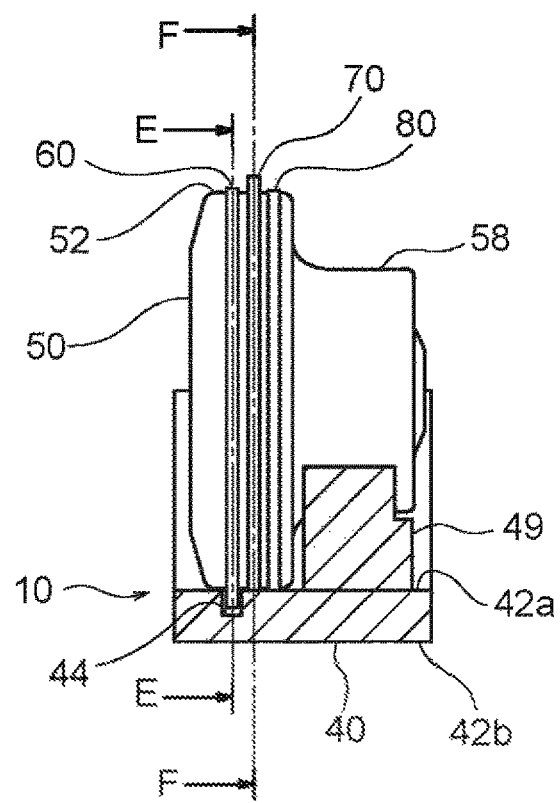
FIG. 9 is a cross-sectional view of the piston ring installation jig taken along line D-D in FIG. 8.

Next, a second embodiment of the piston ring installation jig 10 will be described with reference to FIGS. 8 to 11. FIG. 8 is a side view illustrating a state in which the piston rings are installed on the piston 50 using the piston ring installation jig 10 according to the second embodiment of the disclosure. FIG. 9 is a cross-sectional view of the piston ring installation jig 10 taken along line D-D in FIG. 8. In FIG. 9, the outer shape of the piston 50 is indicated by a thick solid line. Note that, in FIG. 9, the piston 50, the top ring 60, the second ring 70, and the oil ring 80 described later, all of which are accommodated in the piston ring installation jig 10, are illustrated in a non-cross-sectional state, and a protrusion 48 described later is not illustrated. Since the configurations of the piston 50, the top ring 60, the second ring 70, and the oil ring 80 are the same as those in the first embodiment, description thereof will be omitted.

The jig 10 according to the present embodiment includes a main body 40 and a pedestal 49. The main body 40 includes a groove 42, and the protrusion 48.

As illustrated in FIGS. 8 and 9, the main body 40 is formed in a semi-cylindrical shape so as to surround the outer peripheral surface of the piston 50 in the set state in which the piston 50 is set. The pedestal 49 on which the main body 40 is placed is attached to an outer peripheral surface 42b of the main body 40. The protrusion 48 for positioning the piston 50 with respect to the main body 40 protrudes from the inner peripheral surface 42a of the main body 40. In the present embodiment, the surface of the protrusion 48 is formed in a surface shape conforming to the outer peripheral shape of the skirt 58 of the piston 50. By placing the piston 50 at the protrusion 48, the piston 50 is stably held in the main body 40.

Figure 10:
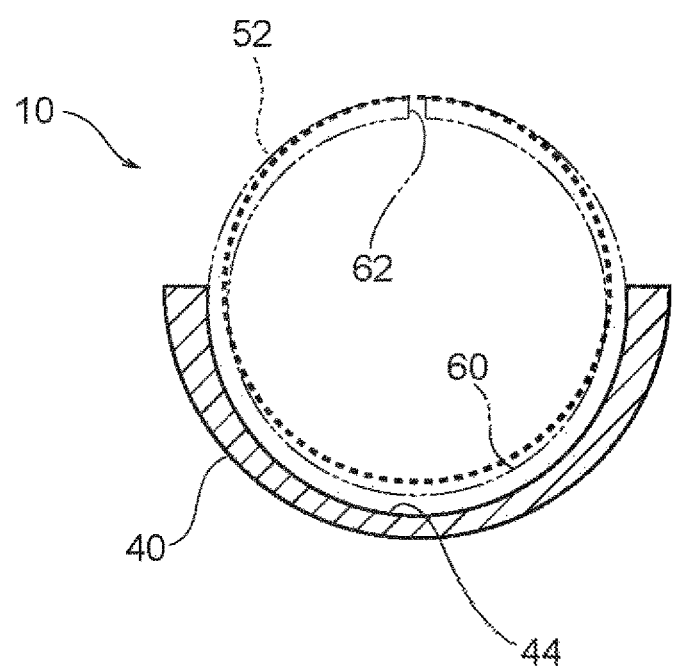
FIG. 10 is a cross-sectional view of the piston ring installation jig taken along line E-E in FIG. 9.
Figure 11:
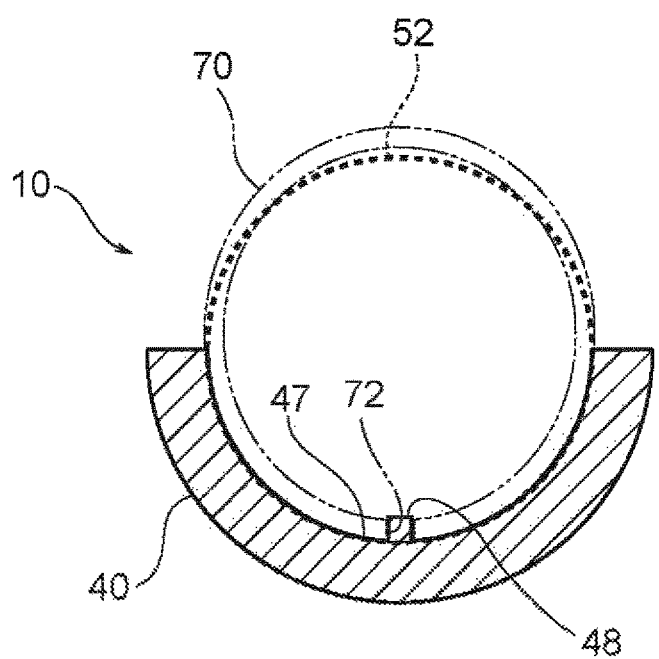
FIG. 11 is a cross-sectional view of the piston ring installation jig taken along line F-F in FIG. 9.

FIG. 10 is a cross-sectional view of the piston ring installation jig 10 taken along line E-E in FIG. 9. FIG. 11 is a cross-sectional view of the piston ring installation jig 10 taken along line F-F in FIG. 9. In FIGS. 10 and 11, the outer periphery of the head 52 of the piston 50 is indicated by a thick broken line, the top ring 60 is indicated by an imaginary line in FIG. 10, and the second ring 70 is indicated by an imaginary line in FIG. 11.

As illustrated in FIGS. 9 and 10, the main body 40 includes a groove 44 at the inner peripheral surface 42a in a region corresponding to the first ring groove 53 of the piston 50. The groove 44 extends in a substantially semi-circular arc shape along the circumferential direction of the main body 40. The groove 44 has a circular arc shape whose circle center is biased more to the outer peripheral side of the main body 40 than the circle center of the inner peripheral surface 42a of the main body 40. As illustrated in FIG. 10, the groove 44 is formed so as to have the largest groove depth at a center portion of the main body 40 in the circumferential direction.

As illustrated in FIG. 11, the main body 40 includes a non-groove-formed portion 47 that is flush with the inner peripheral surface 42a of the main body 40, in the region corresponding to the second ring groove 54 of the piston 50. The protrusion 48 protruding radially inward is formed at the non-groove-formed portion 47. The width of the protrusion 48 is set to be smaller than the width of the ring gap 72 of the second ring 70, and the protruding length of the protrusion 48 is set to be equal to or less than the depth of the second ring groove 54.

In the jig 10 according to the present embodiment, in a state in which the piston 50 installed with the piston rings is set in the jig 10, as illustrated in FIGS. 8 to 11, the ring gap 62 of the top ring 60 is accommodated in the first ring groove 53, and the protrusion 48 of the jig 10 is inserted into the ring gap 62. Further, the ring gap 72 of the second ring 70 is accommodated in the second ring groove 54. In this way, in the jig 10 according to the present embodiment, the ring gaps 62, 72 of the rings 60, 70 can be appropriately accommodated in the ring grooves 53, 54 of the piston 50, respectively.

Note that the disclosure is not limited to the embodiments described above, and various modifications can be made without departing from the spirit of the disclosure.

For example, the number of the compression rings 60, 70 for which the positioning of the ring gaps 62, 72 is performed by the jig 10 is not limited to two, and it is sufficient that there be at least one.

With the piston ring installation jig according to the disclosure, when installing a piston ring in a ring groove of a piston, the ring gap of the piston ring can be accommodated in the ring groove.

The invention claimed is:

1. A piston ring installation jig to be used when installing a first piston ring, having a ring gap, in a first ring groove formed in an outer peripheral surface of a piston, the piston ring installation jig comprising
a main body having a first main body portion having a semi-cylindrical shape that is configured for surrounding the outer peripheral surface of the piston,
the first main body portion comprising a first arc shaped groove formed in an inner peripheral surface of the first main body portion in a region located as to correspond to a location of the first ring groove of the piston such that a portion of the first piston ring in a circumferential direction is insertable into the first arc shaped groove, and
the first arc shaped groove defines a circle which has a circle center biased more to an outer peripheral side of the first main body portion than a circle center of the inner peripheral surface of the first main body portion, and wherein
the piston has a second ring groove separated from the first ring groove in an axial direction,
the main body comprises a second main body portion disposed opposing the first main body portion as to form a cylindrical shape,
the first main body portion has the first arc shaped groove in a region corresponding to a location of the first ring groove of the piston, and has a first non-groove-formed portion located in a region corresponding to a location of the second ring groove of the piston, the first non-groove-formed portion being defined by the inner peripheral surface of the first main body portion, and
the second main body portion has a second arc shaped groove located in a region corresponding to a location of the second ring groove of the piston, and has a second non-groove-formed portion located in a region corresponding to a location of the first ring groove of the piston, the second non-groove-formed portion being defined by an inner peripheral surface of the second main body portion.

2. The piston ring installation jig according to claim 1, wherein
the first main body portion portion comprises a first protrusion at the first non-groove-formed portion, the first protrusion protruding radially inward and being insertable into a ring gap of the second piston ring when the second piston ring is positioned in the second ring groove of the piston, and the second main body portion comprises a second protrusion at the second non-groove-formed portion, the second protrusion protruding radially inward and being insertable into the ring gap of the first piston ring when the first piston ring is positioned in the first ring groove.

3. The piston ring installation jig according to claim 2, wherein one end portion of the first main body portion in the circumferential direction and one end portion of the second main body portion in the circumferential direction are coupled to each other via a hinge.

4. The piston ring installation jig according to claim 1, wherein one end portion of the first main body portion in the circumferential direction and one end portion of the second main body portion in the circumferential direction are coupled to each other via a hinge.

5. A piston ring installation method using a piston ring assembling jig used for installing a piston ring, having a ring gap, in a first ring groove formed in an outer peripheral surface of a piston, the piston ring installation jig comprising a main body having a semi-cylindrical shape that is configured for surrounding the outer peripheral surface of the piston, the main body comprising an arc shaped groove formed in an inner peripheral surface of the main body in a region located as to correspond to a location of the first ring groove of the piston such that a portion of the piston ring in a circumferential direction is insertable into the arc shaped groove, and the arc shaped groove defines a circle which has a circle center biased more to an outer peripheral side of the main body than a circle center of the inner peripheral surface of the main body; with the piston ring assembling method comprising:

inserting a portion of the piston ring other than the ring gap into the arc shaped groove of the main body; and assembling the piston ring to the piston to position the ring gap in the first ring groove of the piston.

\* \* \* \* \*